United States Patent
Worsham, II

(10) Patent No.: US 11,059,577 B2
(45) Date of Patent: Jul. 13, 2021

(54) SYSTEM AND METHOD FOR MONITORING AIRCRAFT PILOT CONTROL POSITION AND PROVIDING A RETRIM PROMPT

(71) Applicant: Textron Innovations Inc., Providence, RI (US)

(72) Inventor: Robert Earl Worsham, II, Weatherford, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 171 days.

(21) Appl. No.: 16/363,066

(22) Filed: Mar. 25, 2019

(65) Prior Publication Data
US 2020/0307780 A1 Oct. 1, 2020

(51) Int. Cl.
*B64C 27/57* (2006.01)
*G05D 1/00* (2006.01)
*G05D 1/08* (2006.01)

(52) U.S. Cl.
CPC ........... *B64C 27/57* (2013.01); *G05D 1/0055* (2013.01); *G05D 1/0858* (2013.01)

(58) Field of Classification Search
CPC ....... B64C 27/57; B64C 27/54; B64C 13/503; B64C 19/00; G05D 1/0055; G05D 1/0858; G05D 1/0816; B64D 45/00; B64D 2045/0085
See application file for complete search history.

(56) References Cited

U.S. PATENT DOCUMENTS

| 4,095,763 A | 6/1978 | Builta |
| 2008/0237402 A1* | 10/2008 | Ausman ............... G05D 1/0077 244/229 |
| 2013/0221153 A1* | 8/2013 | Worsham, II ........ G05D 1/0858 244/17.13 |
| 2017/0291690 A1* | 10/2017 | Litwinowicz ........... B64C 27/57 |

FOREIGN PATENT DOCUMENTS

| EP | 3428758 A1 | 1/2019 |
| GB | 2140174 A | 11/1984 |

* cited by examiner

*Primary Examiner* — Marthe Y Marc-Coleman
(74) *Attorney, Agent, or Firm* — Slater Matsil, LLP

(57) ABSTRACT

A rotorcraft including a pilot control having a sensor that generates pilot control position data, a flight control that controls a flight characteristic of the rotorcraft, a trim system connected to the pilot control and configured to move the pilot control, and a flight control computer (FCC) configured to receive the pilot control position data from the sensor. The FCC executes a first flight control process and generates, according to the first flight control commands, a trim signal indicating a target position for the pilot control and to send the trim signal to the trim system to cause the trim system to attempt to move the pilot control to the target position to reflect a position of the flight control, and to monitor a working state of the trim system and execute a retrim process in response to determining that the trim system has failed.

20 Claims, 7 Drawing Sheets

SYSTEM AND METHOD FOR MONITORING AIRCRAFT PILOT CONTROL POSITION AND PROVIDING A RETRIM PROMPT

TECHNICAL FIELD

The present invention relates generally to a system and method for automated flight control fault detection in a rotorcraft, and, in particular embodiments, to a system and method for determining and notifying a pilot of a failure of an automated trim drive system for a pilot control.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

An embodiment rotor includes a pilot control having a sensor configured to generate pilot control position data indicating a pilot control position, a flight control configured to control a flight characteristic of the rotorcraft, a trim system connected to the pilot control and configured to move the pilot control, and a flight control computer (FCC) configured to receive the pilot control position data from the sensor. The FCC is configured to execute a first flight control process, and the first flight control process comprises generating first flight control commands and sending the first flight control commands to the flight control to cause the rotorcraft to operate according to the first flight control process. The FCC is further configured to generate, according to the first flight control commands, a trim signal indicating a target position for the pilot control and to send the trim signal to the trim system to cause the trim system to attempt to move the pilot control to the target position to reflect a position of the flight control, and to monitor a working state of the trim system and execute a retrim process in response to determining that the trim system has failed.

An embodiment flight control computer (FCC) includes a processor, and a non-transitory computer-readable storage medium storing a program to be executed by the processor. The program includes instructions for receiving pilot control position data from a pilot control sensor of a rotorcraft, the pilot control position data indicating a pilot control position of a pilot control associated with the pilot control sensor, providing a first flight control process by generating first flight control commands according to the first flight control process and operating the rotorcraft according to the first flight control process by sending the first flight control commands to a flight control of the rotorcraft, generating, according to the first flight control commands, a trim signal indicating a target position for the pilot control associated with a position of the flight control, sending the trim signals to a trim system to cause the trim system to attempt to move the pilot control to the target position, determining an operating state of the trim system according to the target position of the pilot control, and providing a retrim process in response to the determining the operating state of the trim system indicating that the trim system has failed.

An embodiment method of operating a rotorcraft includes receiving, by a flight control computer (FCC), pilot control position data from a pilot control sensor of the rotorcraft, the pilot control position data indicating a pilot control position of a pilot control associated with the pilot control sensor, providing, by the FCC, a first flight control process by generating first flight control commands according to the first flight control process and operating the rotorcraft according to the first flight control process by sending the first flight control commands to a flight control of the rotorcraft, generating, by the FCC and according to the first flight control commands, a trim signal indicating a target position for the pilot control associated with a position of the flight control, sending the trim signals by the FCC to a trim system to cause the trim system to attempt to move the pilot control to the target position, determining an operating state of the trim system by the FCC and according to the target position of the pilot control, and providing, by the FCC, a retrim process in response to the determining the operating state of the trim system indicating that the trim system has failed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
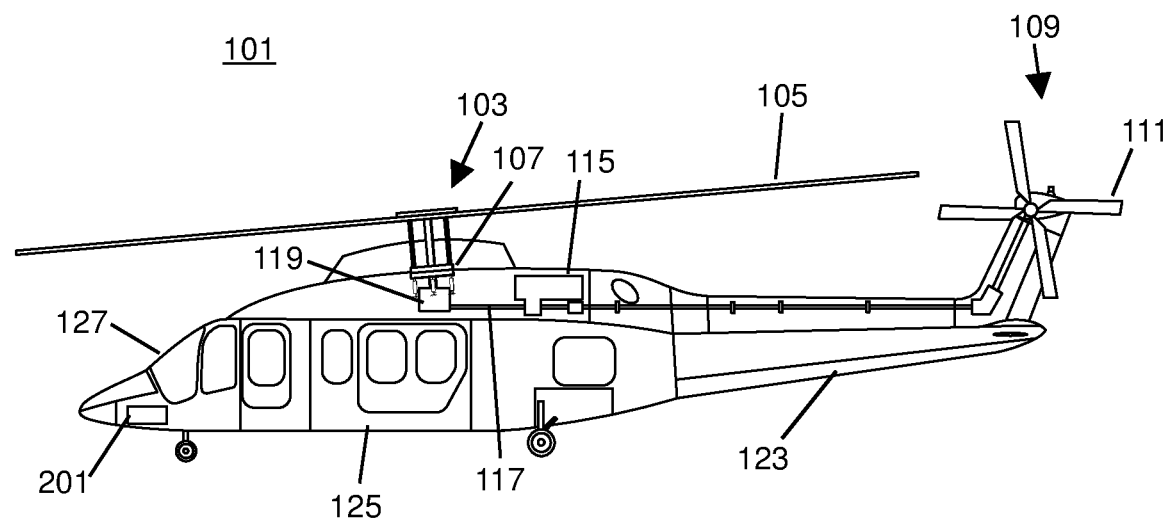
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight procedures provide for default or suggested control positioning, or the like.

FBW systems for rotorcraft must provide stable flight characteristics for FBW controlled flight parameters while permitting the pilot to override or work with any suggested flight parameters suggested by the FBW system. Additionally, in providing enhanced control and automated functionality for rotorcraft flight, the FBW must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the system and method described herein are directed to a system and method for determining when the automated trim system of the FBW system is not responding as expected, and notifying the pilot to release the trim system or otherwise adjusting the automated flight control system. In an FBW system, the pilot controls are physically disconnected from the flight controls, and are managed by the FBW system in response to commands generated according to sensor signals indicating the position of the pilot controls. In some embodiments, when an automated flight control process manages flight characteristics of the rotorcraft, the FBW system may use a trim motor to drive a pilot control so that the position of the pilot control position reflects the position of the flight control associated with the pilot control. Thus, when the FBW system automatically controls the flight characteristics of the rotorcraft, for example, when the pilot releases manual control of the control stick or pilot control, the pilot control is in a position that is expected by the pilot, and reflects the actual position of the flight controls. However, when the system driving the pilot control fails, either through an equipment failure, the control system reaching a movement limit, a linkage failure, the control software being overloaded, or the like, in some embodiments, the FBW system may alert the pilot that the control stick position does not reflect the flight control positions. In some embodiments, this permits the pilot to cause the FBW system to release the automated control of the flight controls or otherwise terminate control by an automated flight control process. In other embodiments, the FBW system may automatically terminate or otherwise stop control of the aircraft by the automated flight control system when a failure or other error is detected.

In some embodiments, the FBW system may use integrators to determine a delta, error, or difference between the actual position of the pilot control and the target position of the, intended position or expected position of a pilot control and an associated flight controls. For example, an airspeed integrator may determine a different between an actual airspeed and a desired airspeed, while an attitude hold controller may include a roll integrator that determines a difference between a desired roll attitude and an actual roll attitude. The integrator may be used by the FBW system as a feedback or gain element, with the value held in the integrator, which may, for example, indicate the difference between an actual flight parameter and the desired flight parameter or control input associated with the desired flight parameter, and may be used as a feedback value to determine the amplitude of a flight control command. The FBW system may monitor the value of the integrators, or the actual position of the pilot control in relation to the flight control position, to determine whether the trim system driving the pilot control has moved the pilot control as commanded. The FBW system may determine that the trim system has failed if the FBW system determines that the pilot control is not being moved automatically as expected, and may release or terminate automated control of the flight control when the FBW system determines that the trim system is not responding. In some embodiments, the FBW system may alert the pilot to the trim system failure so that the pilot may take control of the appropriate pilot control and may terminate automated control of the flight control in response to the pilot releasing the trim functionality, for example, by activating a force trim release (FTR) button. Thus, the flight controls may be returned to a position that accurately reflects the pilot control positioning, or the pilot may be alerted to the difference in the flight control position and pilot control position.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system 201 sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system 201. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
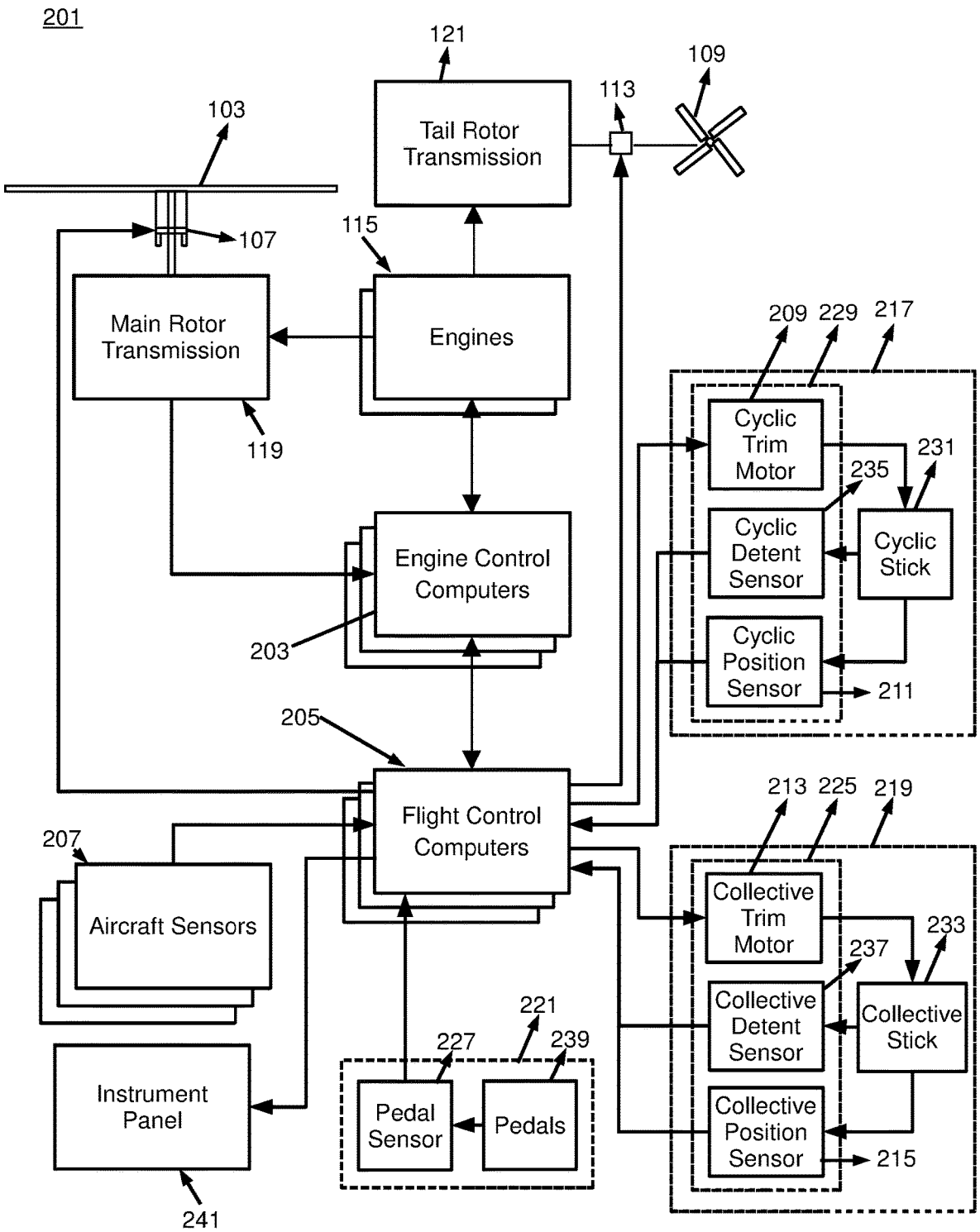
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator (not shown), and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the actuators for the tail rotor 109, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions, and the like. For example, the aircraft sensors 207 may include sensors for determining which, if any, wheels are in contact with the ground, or measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a positon determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. The cyclic detent sensor 235 and collective detent sensor 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
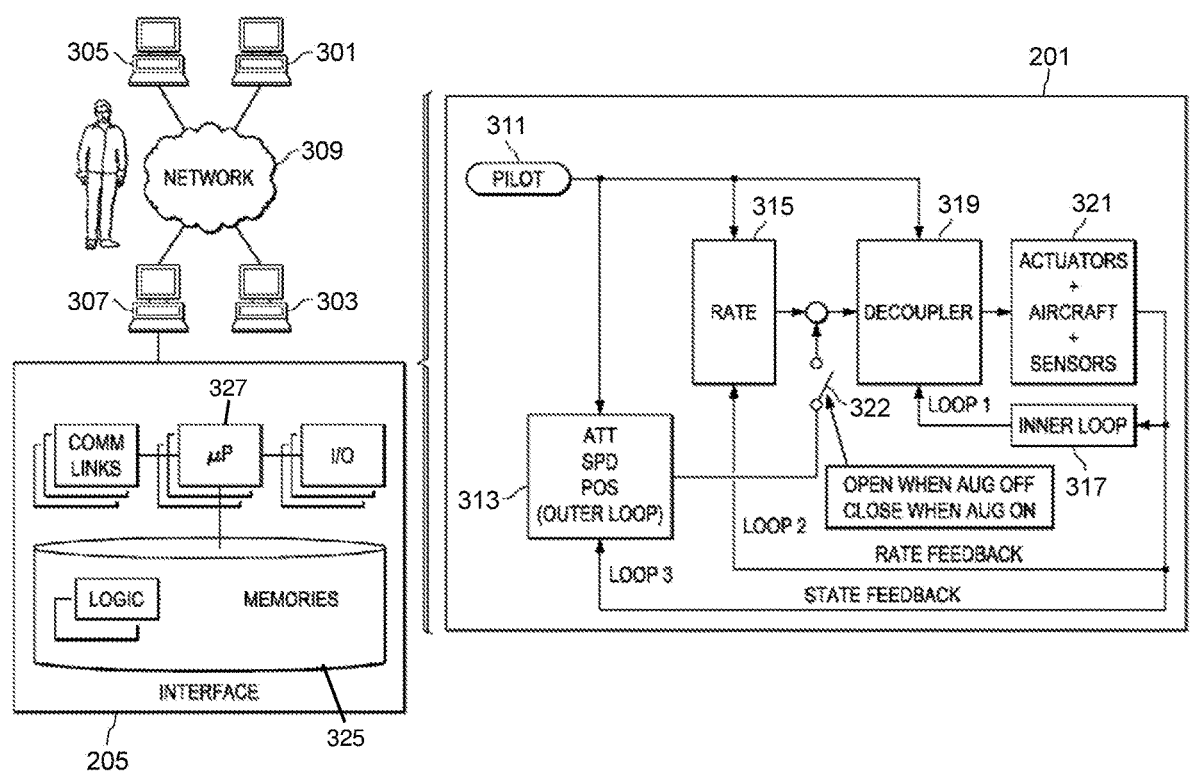
FIG. 3 representatively illustrates a three-loop flight control system according to some embodiments.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop or rate loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop 317 and rate loop 315 may stay active, independent of various outer loop hold loop modes. Outer loop 313 may include cascaded layers of loops, including an attitude loop, a speed loop, a position loop, a vertical speed loop, an altitude loop, and a heading loop. In accordance with some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The automated flight control processes may include one or more automated flight control processes that augment, control or correct flight parameters of a rotorcraft. In some embodiments, the FCCs may provide an automate flight control process that generates commands that are sent to the actuators to move flight controls such as the swashplate or tail rotor. In other embodiments, the FCCs may augment pilot commands that are provided through the pilot controls to correct or smooth out a pilot command, for example, to correct for a wind gust, cross control from other inputs, or the like. Thus, the FCCs may generate new commands, or may modify a received command by adding the amplitude of a command correction to an input command from the pilot controls.

For example, the FCCs may provide an automated flight control process such as an automated hold loop that may include one of more of an attitude hold, position hold, speed hold, a vertical speed hold, hover hold, climb/descent hold, heading hold, or other automated hold processes. The FCCs may also provide automated flight path processes such as automated approach to landing, automated go around, automated approach to hover, a process for automatically following a flight path, or another automated flight path process. The FCCs may monitor the state of the rotorcraft to provide the automated flight control processes, and may use the outer loop 313 to modify pilot inputs or other control signals, or to generate control signals.

The FCCs may use the trim assemblies to move a pilot control to a position reflecting the position of the associated flight control when the FCC implements the automated flight control process. Moving the pilot control or stick permits the pilot to retake manual control and intuitively know the position of the flight control from the position of the pilot control. The FCC may monitor the position of the pilot controls to determine whether the trim assemblies have moved the pilot controls as commanded, and when the FCCs determine that the pilot control is not in the target or commanded position, the FCCs may determine that the relevant trim assembly has failed. The FCCs may modify, freeze, hold, turn off, or otherwise manage one or more hold loops or other automated flight control processes, or may notify the pilot to manually terminate the automated flight control processes in response to the FCCs determining that one or more trim systems have failed or are otherwise out or synchronization with the flight controls.

In some embodiments, when a trim assembly fails, the FCCs may provide a retrim prompt to the pilot to notify the pilot of the trim assembly failure and give the pilot the opportunity to terminate any associated automated flight control processes or to adjust or reinitialize a trim element. In other embodiments, the FCCs may automatically terminate an automated flight control process when a trim assembly failure is identified. In some embodiments, the FCCs may turn off or freeze one or more automated flight control processes automatically or in response to a pilot command, for example when a trim system is determined to have failed. For example, the FCCs may turn off all automated flight control processes implemented in the outer loop, or disconnect the output of an outer loop flight control process to prevent commands generated by the flight control process from being implemented. In some embodiments, the FCCs may also freeze or offload integrators in, for example, the automated flight control process. In some embodiments, the modes or flight control processes may still be running, and the commands may be generated by the FCCs, and may, for example, be displayed, without being implemented. Permitting the flight control processes to run in a disconnected state permits the flight control processes to continue to receive data and stay current in relation to the rotorcraft's flight characteristics, and avoids a need to reinitialize or otherwise build up feedback data values if the flight control processes are reconnected at a later point.

Figure 4:
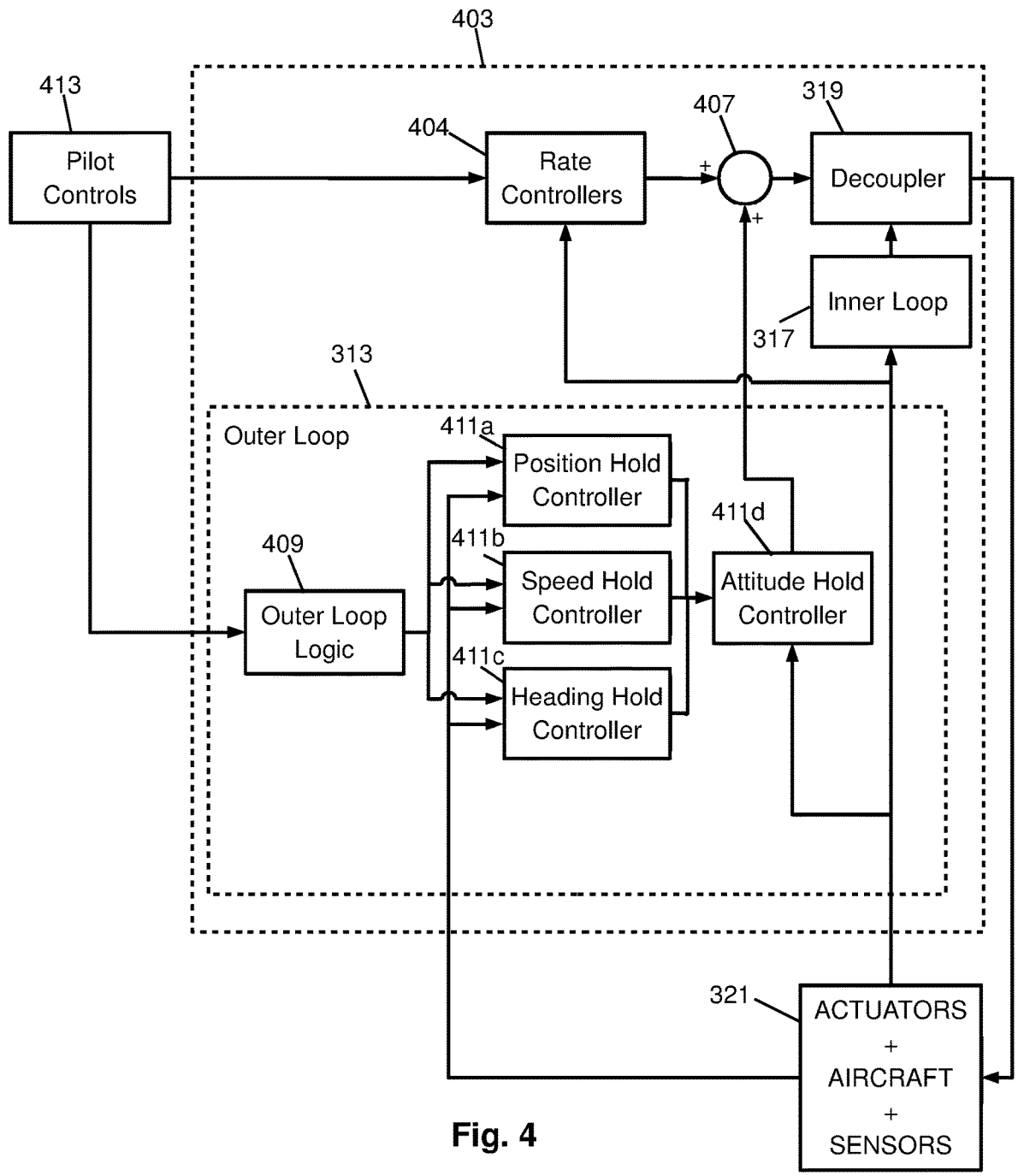
FIG. 4 is a diagram illustrating a system for controlling a rotorcraft according to some embodiments.

FIG. 4 is a diagram illustrating a system 401 for controlling a rotorcraft using flight hold elements according to some embodiments. Pilot controls 413 are, for example, control elements such as a collective stick and cyclic stick that generate the respective pitch and roll commands. As shown, pilot controls 413 interface with flight controller 403. In various embodiments, flight controller 403 is implemented using the FCCs or other processing hardware. Flight controller 403 also interfaces with and controls aircraft equipment 321 representing various actuators, sensors, and the physical body of the rotorcraft. In various embodiments, flight controller 403 controls aircraft equipment 321 using three loops, for example, the inner loop 317, a rate feedback loop (See FIG. 3) and a state feedback loop (See FIG. 3). The inner loop 317 stabilizes the dynamics of the rotorcraft, the rate loop controls the angular rates of the rotorcraft, and the outer loop 313 provides control signals to the inner loop 317 and/or rate loops to achieve a desired attitude, speed and position of the rotorcraft. In some embodiments, the outer loop 313 supports and provides flight augmentation, automated flight control processes, or auto-pilot functionality and may be manually or automatically disabled based on flight and system conditions. The inner loop 317 and rate feedback loops, on the other hand, remain operational to provide stability to the rotorcraft.

For purposes of illustration, the flight controller 403 is depicted with elements that control various holds provided by the outer loop 313. It should be understood that the flight controller 403 may also include other controllers and control paths that affect rate loops and state feedback systems. The inner loop 317 is controlled or implemented by an inner loop controller, the rate loop is implemented by one or more rate controllers 404 that may include, for example, a pitch rate controller and a roll rate controller. The outer loop 313 is controlled by outer loop logic 409 implemented in conjunction with one or more outer loop hold loop controllers 411 such as a position hold controller 411a, speed hold controller 411b, heading hold controller 411c and attitude hold controller 411d. For clarity, the outer loop 313 is illustrated with hold controllers 411, but other controllers may be implemented instead of, or in addition to, the hold controllers 411. For example, the outer loop 313 may implement automated hold loops such as an attitude hold, position hold, speed hold, a vertical speed hold, hover hold, climb/descent hold, heading hold, or other automated hold processes and may also implement automated flight path processes such as automated approach, automated go around, automated approach to hover, a process for automatically following a flight path, or another automated flight path process, and may further implement one or more other automated flight augmentation or flight control processes.

The inner loop 317 receives sensor feedback from sensors of the aircraft equipment 321 such as gyroscopes and accelerometers within the rotorcraft and provides control signals to various actuators of the aircraft equipment 321, such as swashplate to stabilize the rotorcraft. The rate controllers 404 receive rate feedback for one or more axes from sensors of the aircraft equipment 321 such as rate gyroscopes, and, in some modes of operation, provide a rate command signal based on the rate feedback and the position of the pilot controls 413. Decoupler 319 receives the various rate commands and decouples all 4-axes (pitch, roll, yaw, and vertical) such that, for example, a forward longitudinal stick input does not require the pilot to push the stick diagonally. The outer loop 313 also receives state or rate feedback from the aircraft sensors of the aircraft equipment 321. In some embodiments, one or more of the hold loop controllers 411 receive feedback data from the sensors of the aircraft equipment 321 and control data from the outer loop logic 409 that is generated according to position signals from the pilot controls 413. This feedback may include, for example, speed, position and attitude, and the control data may include signals indicating control inputs made by the pilot and that are adjusted or augmented by the outer loop logic 409.

The hold loop controllers 411 generate hold commands that incorporate or use commands from the inner loop 317, essentially wrapping the inner loop 317 in higher level functionality. The hold loop controllers 411 may generate loop hold commands to execute one or more specific holds based on the feedback data and the control data. In some embodiments, one or more of the hold loop controllers 411 may act independently, and in other embodiments, one or more of the hold loop controllers 411 may act in concert with another outer loop hold loop controller 411. For example, the position hold controller 411a may receive feedback including position data from the sensors of the aircraft equipment 321, and may use the feedback data, along with any control data, to generate position hold commands to maintain a position of the rotorcraft. The position data may indicate an absolute position of the rotorcraft that the FCCs use to determine drift or deviation from a target position, a position delta indicating the displacement from the target position, movement data used to determine a rate of movement from the target position, or the like. The position hold controller 411a may use the position data to determine flight commands to correct for any deviation from the target position. Additionally, the position hold controller 411a may also use any control data received from the pilot controls 413 or outer loop logic 409 indicating that the pilot or outer loops is intentionally or manually moving the rotorcraft, or otherwise changing the target position. Similarly, the speed hold controller 411b, heading hold controller 411c and attitude controller may use relevant rotorcraft flight feedback or control data to generate commands associated with the particular controller's hold function.

Figure 5:
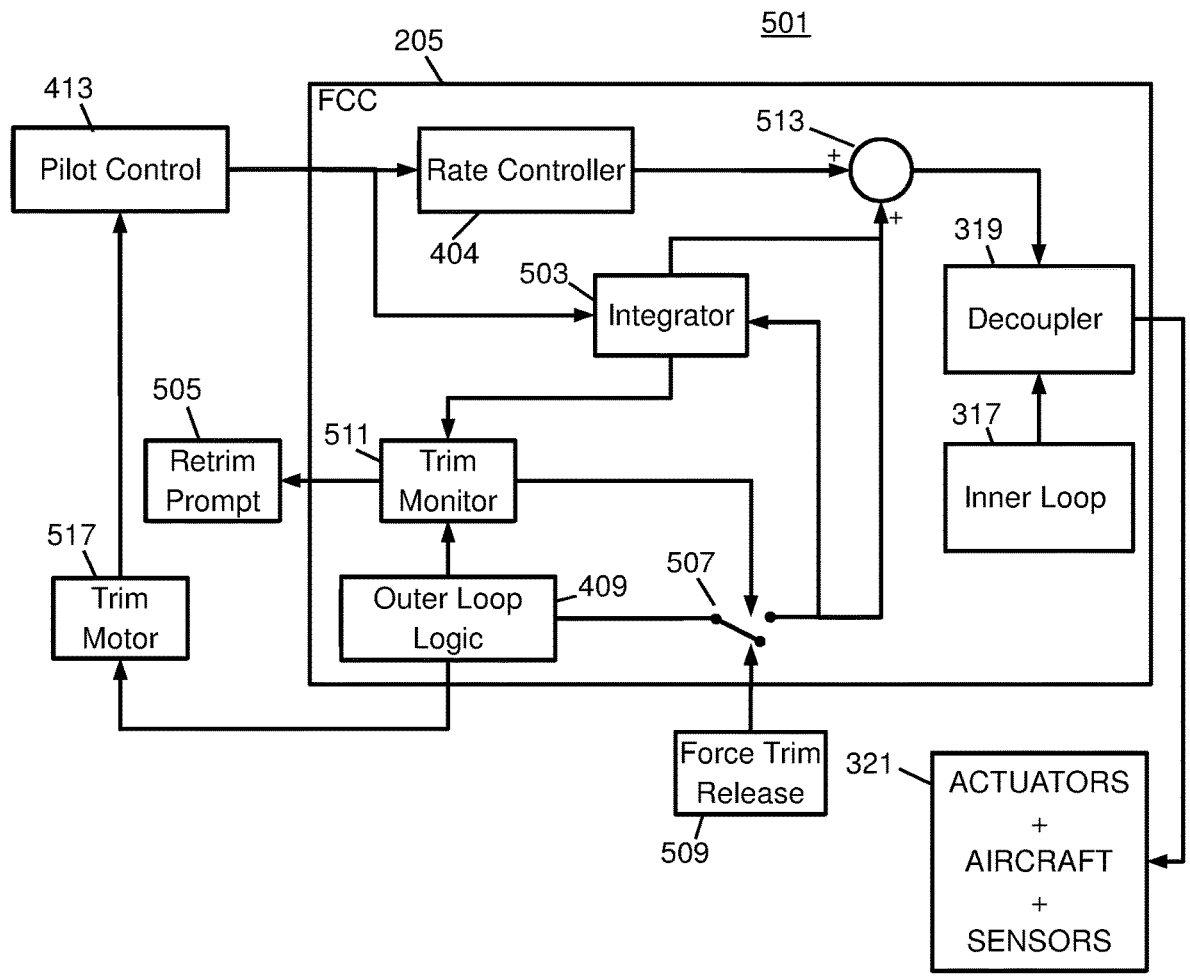
FIG. 5 is a diagram illustrating a trim monitoring system with an integrator according to some embodiments.

FIG. 5 is a diagram illustrating a trim monitoring system 501 with an integrator 503 according to some embodiments. The trim monitoring system 501 may include an FCC 205 that interfaces with one or more pilot controls 413, trim motors 517, and aircraft equipment 321. In some embodiments, a control signal is generated by summer 513 by summing signals generated by the rate controller 404, integrator 503 and outer loop logic 409. The control signal is provided to the decoupler 319, along with commands generated by the inner loop 317, and the decoupler 319 generates actuator commands that are provided to the aircraft equipment.

The FCC 205 implements an integrator 503 and trim monitor 511 that monitor the position of the pilot control 413 to determine if a failure occurs in the trim system, including a failure of the trim motor 517, a failure of the linkage connecting the trim motor 517 to the pilot control 413, or the like. The integrator 503 may be implemented, for example, using an accumulator. The integrator 503 may track the difference between the position of the pilot control 413 and the target position of the pilot control 413. The integrator 503 receives a sensor signal indicating the position of the pilot control 413, and a command signal value indicating the expected position of the pilot control 413. In some embodiments, the integrator 503 may determine the target position of the pilot control 413 from the outer loop logic 409 and may produce a delta value or error value signal based on the difference between the actual position of the pilot control 413 and the target pilot control position or a command produced by the outer loop logic 409.

In some embodiments, the integrator 503 is used as a feedback element that corrects for the error or delta in the pilot control position. The integrator 503 provides the error value to the summer 513 to bring the actuators of the aircraft equipment 321 to the target position, and also provides the error value signal to the trim monitor 511. The trim monitor 511 receives the error value generated by the integrator 503 and implements a retrim process if the trim monitor 511 determines that the error exceeds a retrim threshold for a predetermined time. The trim process may include providing a retrim prompt through a retrim prompt system 505, or may include terminating a flight control process of the outer loop logic 409. In some embodiments, the retrim prompt may be provided as a visual, audio or tactile warning to the pilot that prompts the pilot to take manual control of the rotorcraft and terminate the automated flight control process. Thus, the pilot may be warned that the pilot control position varies from the flight control position, and the pilot may take appropriate action, including terminating the flight control processes provided by the outer loop logic 409.

The flight control process of the outer loop logic 409 may be terminated automatically by the trim monitor 511, or in response to a pilot retrim command, for example, a force trim release (FTR) command generated by a pilot pressing an FTR switch 509. In some embodiments, the FTR command may temporarily disconnect the outer loop logic 409, and allow the outer loop logic 409 to resynchronize reference values, zero out an integrator 503 associated with a particular outer loop flight control process, or otherwise permit the outer loop logic 409 to run or take in new data while disconnecting the output of the outer loop logic 409 from the control loop. For example, the a pilot pressing the FTR switch 509 may disengage clutch in a trim motor driving a pilot control, and allows the FCCs 205 to synchronize an airspeed reference. Releasing the FTR switch 509 uses the new, current airspeed as a new airspeed reference, and integrator may start to build up again to determine a delta between the actual airspeed and the new airspeed reference. Alternatively, the pilot may select an augmentation off (Aug-off) state, manually, or by holding the FTR switch 509. The Aug-off state maintains the integrator at zero, with the trim motor is disconnected, and any hold loops released so there is no speed reference. Thus, if the pilot control position differs from the expected control position by more than the retrim threshold, and commands to the trim motor 517 fail to reduce the error by moving the pilot control to the intended position, the trim monitor 511 may determine that the trim system has failed.

The flight control process provided by the outer loop logic 409 may, in some embodiments, be terminated by freezing the process, or terminating transmission of the outer loop logic 409 commands to the summer 513 for inclusion in the control signal generated by the summer 513. A logical or hardware cutoff 507 may be used to terminate transmission of the outer loop logic 409 commands.

In some embodiments, the trim monitor 511 may also determine the detent state of the pilot control 413, and provide the retrim process accordingly. For example, if the pilot is manually controlling the pilot control 413 and pilot control 413 is OOD, the trim monitor 511 may continue monitoring for a failure of the trim system without providing the retrim process. However, if the pilot control is OOD and the control stick does not match the target position of the pilot control or the actual position of the associated actuator or flight control, another process may notify the pilot that the pilot control and flight controls are not synchronized. If the trim monitor 511 determines that the pilot is out of the loop, having released manual control of the pilot control 413, and that the pilot control 413 is ID, the trim monitor may provide the retrim process.

Terminating the flight control processes removes commands generated by the outer loop from the control commands generated by the summer 513, so that the actuators of the aircraft equipment 321 are controlled by the pilot controls 413, rate controller 404 and inner loop 317. Thus, flight augmentation provided by the inner loop and rate controllers 404 for stabilizing flight of the rotorcraft, along with full pilot control authority, are maintained while the outer loop logic automated flight control processes are terminated. Thus, the FCCs may execute a second flight control process such as flight stabilization after the first flight control process is terminated. In some embodiments, the second flight control process provided by the inner loop 317 or rate controller 404 is different from the first flight control process provided by the outer loop logic 409. Additionally, terminating the outer loop logic 409 automated flight control processes reduces the need to drive the pilot control 413 to a position reflecting the actual flight control position, since the rate controller 404 and inner loop 317 tend to provide minor flight control movement rather than the gross flight control movement provided by the outer loop logic 409. Terminating the outer loop logic 409 automated flight control processes further offloads the integrator 503, as the need to determine the difference between the actual and target positions of the pilot control 413 is removed since the outer loop logic 409 is not providing commands requiring automated movement of the pilot control 413.

Figure 6:
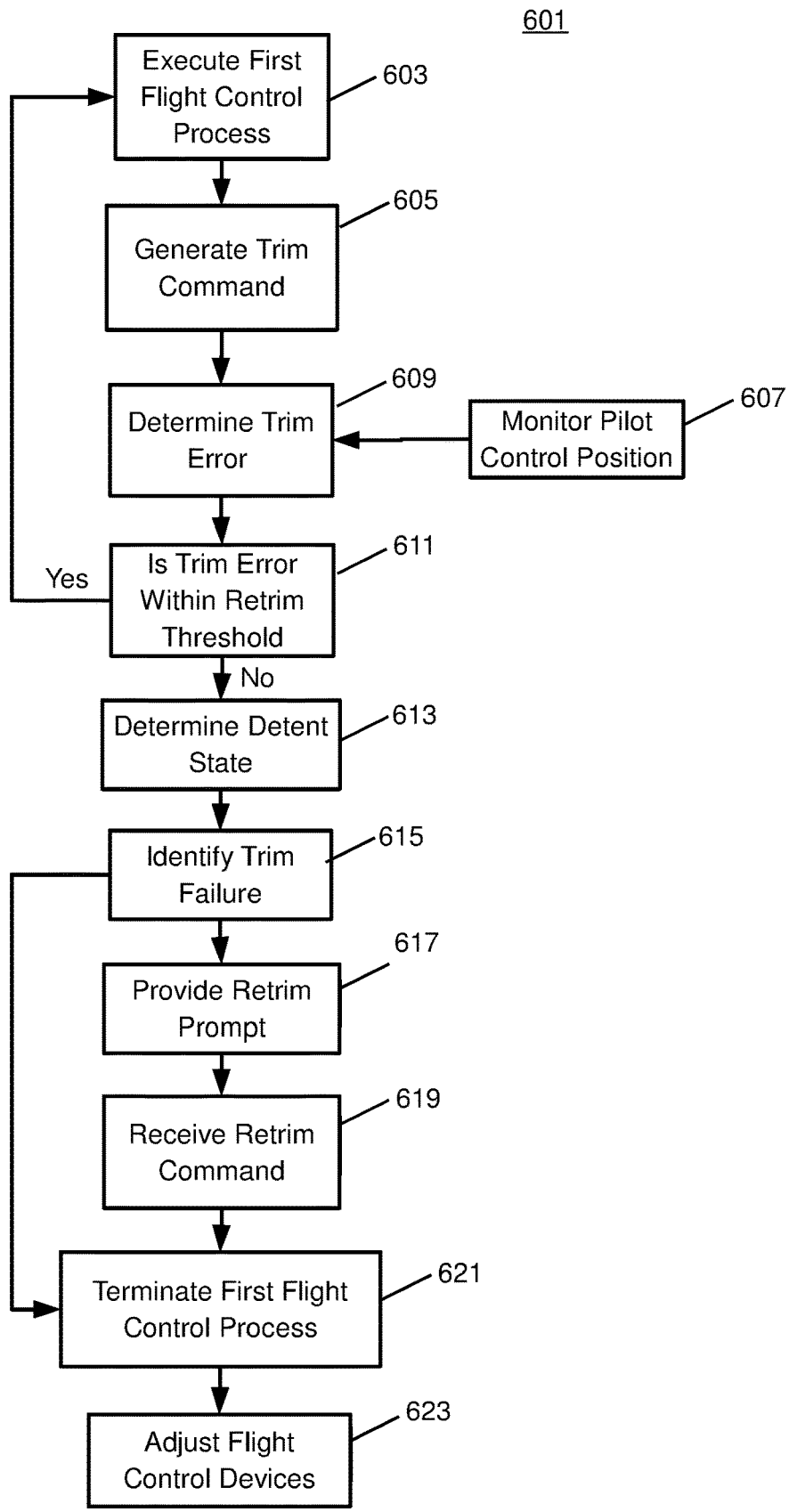
FIG. 6 is a flow diagram illustrating a method for providing a retrim prompt and offloading an integrator according to some embodiments.

FIG. 6 is a flow diagram illustrating a method 601 for providing a retrim prompt and offloading an integrator according to some embodiments. In block 603, a rotorcraft executes a first flight control process. In some embodiments, the first flight control process is an automated flight control process controlling operation of the rotorcraft and may be provided by the outer loop logic implemented on an FCC. The FCC may execute or provide the first flight control process by generating first flight control commands according to the first flight control process and may operate the rotorcraft according to the first flight control process by sending the first flight control commands to a flight control of the rotorcraft.

In block 605, the FCC generates a trim command. In some embodiments, the trim command is a trim signal indicating a target position for a pilot control associated with a position of the flight control, and the FCC may send the trim signal to the trim system to cause the trim system to attempt to move the pilot control to the target position. In block 607, the FCC monitors the pilot control position. The FCC may receive pilot control position data from a pilot control sensor of the rotorcraft, and the pilot control position data may indicate the actual position of the pilot control.

In block 609, the FCC determines the trim error. In some embodiments, the FCCs determine a trim error value associated with a difference between an actual position of the pilot control indicated by the pilot control position data and the target position for the pilot control. The FCC may implement an integrator to determine or track the trim error value. In block 611, the FCC determines whether the trim error is within a retrim threshold. If the trim error is below, or within the retrim threshold, the FCC proceeds with executing the first flight control process in block 603. If the trim error is greater than, equal to, or outside of the trim threshold, the FCC proceeds to further determine whether a trim failure has occurred. In block 613, the FCC determines the detent state of the pilot control. In block 615, the FCC identifies whether a trim failure has occurred. In some embodiments, the FCC determines the operating state of the trim system, and may determine the operating state of the trim system according to the target position of the pilot control or according to the trim error value. In some embodiments, the FCC may determine that the trim system has failed in response to the trim error value exceeding the retrim threshold for a predetermined time, and may further determine that the trim system has failed in response to determining that a pilot has released manual control of the pilot control and that the pilot control is in-detent.

In block 617, the FCC may provide a retrim prompt to a pilot in response to determining that the trim system has failed. In block 619, the FCC may receive a pilot retrim command provided by a pilot after the retrim prompt is provided. In some embodiments, the pilot retrim command may be activation of an FTR button or switch, a manual command to terminate one or more flight control processes, or another pilot initiated command. In block 621, the first flight control process may be terminated. In some embodiments, the FCC may automatically terminate the first flight control process upon identifying the trim failure in block 617, or may terminate the first flight control process in response to receiving the trim command in block 619. In block 623, flight control devices may be adjusted. In some embodiments, terminating the first flight control process removes command generated for the first flight control process from the control commands provided to flight controls, returning the flight controls to be under control of the pilot controls and inner and rate loop commands. A second flight control process different from the first flight control process may be provided upon termination of the first flight control process, with the second flight control process comprising command or control by the pilot, inner loop and rate loop augmentation.

Figure 7:
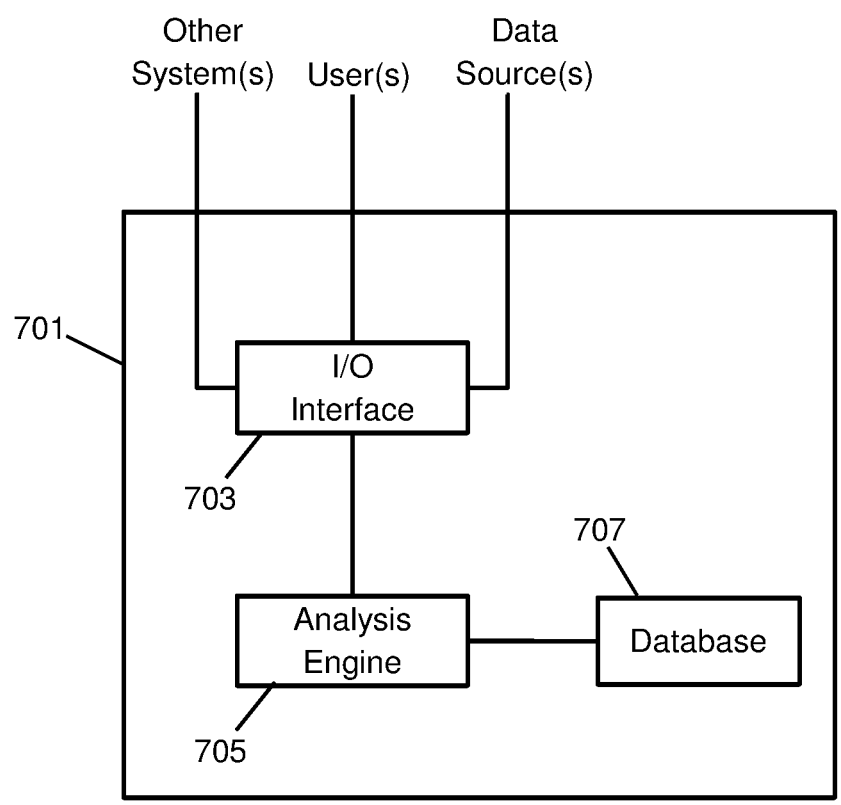
FIG. 7 illustrates an embodiment computer system.

FIG. 7 illustrates a computer system 701. The computer system 701 can be configured for performing one or more functions with regard to the operation of the flight control system 201 and the method 500, as described herein. Further, any processing and analysis can be partly or fully performed by the computer system 701. The computer system 701 can be partly or fully integrated with other aircraft computer systems or can be partly or fully removed from the rotorcraft. In some embodiments, the computer system 701 may be implements as an FCC, and may monitor the state of the trims system, and provide or terminate one or more automated flight control processes based on the operating state of the trim system.

The computer system 701 can include an input/output (I/O) interface 703, an analysis engine 705, and a database 707. Alternative embodiments can combine or distribute the I/O interface 703, the analysis engine 705, and the database 707, as desired. Embodiments of the computer system 701 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 703 can provide a communication link between external users, systems, and data sources and components of the computer system 701. The I/O interface 703 can be configured for allowing one or more users to input information to the computer system 701 via any known input device. Examples can include a keyboard, mouse, touch screen, and/or any other desired input device. The I/O interface 703 can be configured for allowing one or more users to receive information output from the computer system 701 via any known output device. Examples can include a display monitor, a printer, cockpit display, and/or any other desired output device. The I/O interface 703 can be configured for allowing other systems to communicate with the computer system 701. For example, the I/O interface 703 can allow one or more remote computer(s) to access information, input information, and/or remotely instruct the computer system 701 to perform one or more of the tasks described herein. The I/O interface 703 can be configured for allowing communication with one or more remote data sources. For example, the I/O interface 703 can allow one or more remote data source(s) to access information, input information, and/or remotely instruct the computer system 701 to perform one or more of the tasks described herein.

The database 707 provides persistent data storage for the computer system 701. Although the term "database" is primarily used, a memory or other suitable data storage arrangement may provide the functionality of the database 707. In alternative embodiments, the database 707 can be integral to or separate from the computer system 701 and can operate on one or more computers. The database 707 preferably provides non-volatile data storage for any information suitable to support the operation of the flight control system 201 and the method 601, including various types of data discussed further herein. The analysis engine 705 can include various combinations of one or more processors, memories, and software components.

An embodiment rotorcraft includes a pilot control having a sensor configured to generate pilot control position data indicating a pilot control position, a flight control configured to control a flight characteristic of the rotorcraft, a trim system connected to the pilot control and configured to move the pilot control, and a flight control computer (FCC) configured to receive the pilot control position data from the sensor. The FCC is configured to execute a first flight control process, and the first flight control process comprises generating first flight control commands and sending the first flight control commands to the flight control to cause the rotorcraft to operate according to the first flight control process. The FCC is further configured to generate, according to the first flight control commands, a trim signal indicating a target position for the pilot control and to send the trim signal to the trim system to cause the trim system to attempt to move the pilot control to the target position to reflect a position of the flight control, and to monitor a working state of the trim system and execute a retrim process in response to determining that the trim system has failed.

In some embodiments, the FCC is further configured to execute the retrim process by terminating the first flight control process and further by executing a second flight control process different from the first flight control process. In some embodiments, the FCC is further configured to execute the retrim process by providing a retrim prompt. In some embodiments, the FCC is further configured to execute the retrim process by terminating the first flight control process in response to a pilot retrim command provided by a pilot after the retrim prompt is provided. In some embodiments, the FCC is further configured to implement an integrator that determines an error value associated with a difference between the pilot control position and the target position for the pilot control, and the FCC is further configured to determine the working state of the trim system according to the error value. In some embodiments, the FCC is further configured to determine that the trim system has failed in response to the error value exceeding a retrim threshold for a predetermined time. In some embodiments, the FCC is further configured to determine that the trim system has failed further in response to determining that a pilot has released manual control of the pilot control and that the pilot control is in-detent.

An embodiment flight control computer (FCC) includes a processor, and a non-transitory computer-readable storage medium storing a program to be executed by the processor. The program includes instructions for receiving pilot control position data from a pilot control sensor of a rotorcraft, the pilot control position data indicating a pilot control position of a pilot control associated with the pilot control sensor, providing a first flight control process by generating first flight control commands according to the first flight control process and operating the rotorcraft according to the first flight control process by sending the first flight control commands to a flight control of the rotorcraft, generating, according to the first flight control commands, a trim signal indicating a target position for the pilot control associated with a position of the flight control, sending the trim signals to a trim system to cause the trim system to attempt to move the pilot control to the target position, determining an operating state of the trim system according to the target position of the pilot control, and providing a retrim process in response to the determining the operating state of the trim system indicating that the trim system has failed.

In some embodiments, the instructions for providing the retrim process include instructions for terminating the first flight control process, and providing a second flight control process different from the first flight control process. In some embodiments, the instructions for providing the retrim process include instructions for providing a retrim prompt. In some embodiments, the instructions for providing the retrim process include instructions for receiving a pilot retrim command provided by a pilot after the retrim prompt is provided, and terminating the first flight control process in response to the pilot retrim command. In some embodiments, the program further includes instructions for implementing an integrator that determines an error value associated with a difference between the pilot control position indicated by the pilot control position data and the target position for the pilot control, and wherein the instructions for determining the operating state of the trim system include instructions to determine the operating state of the trim system according to the error value. In some embodiments, the instructions for determining the operating state of the trim system include instructions for determining that the trim system has failed in response to the error value exceeding a retrim threshold for a predetermined time. In some embodiments, the instructions for determining the operating state of the trim system include instructions for determining that the trim system has failed further in response to determining that a pilot has released manual control of the pilot control and that the pilot control is in-detent.

An embodiment method of operating a rotorcraft includes receiving, by a flight control computer (FCC), pilot control position data from a pilot control sensor of the rotorcraft, the pilot control position data indicating a pilot control position of a pilot control associated with the pilot control sensor, providing, by the FCC, a first flight control process by generating first flight control commands according to the first flight control process and operating the rotorcraft according to the first flight control process by sending the first flight control commands to a flight control of the rotorcraft, generating, by the FCC and according to the first flight control commands, a trim signal indicating a target position for the pilot control associated with a position of the flight control, sending the trim signals by the FCC to a trim system to cause the trim system to attempt to move the pilot control to the target position, determining an operating state of the trim system by the FCC and according to the target position of the pilot control, and providing, by the FCC, a retrim process in response to the determining the operating state of the trim system indicating that the trim system has failed.

In some embodiments, providing the retrim process includes terminating the first flight control process, and providing a second flight control process different from the first flight control process. In some embodiments, providing the retrim process further includes providing a retrim prompt. In some embodiments, providing the retrim process further includes receiving a pilot retrim command provided by a pilot after the providing the retrim prompt, and terminating the first flight control process in response to the pilot retrim command. In some embodiments, the method further includes determining an error value associated with a difference between pilot control position indicated by the pilot control position data and the target position for the pilot control, and determining the operating state of the trim system includes determining the operating state of the trim system according to the error value. In some embodiments, determining the operating state of the trim system further comprises determining that the trim system has failed in response to the error value exceeding a retrim threshold for a predetermined time.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
   a pilot control having a sensor configured to generate pilot control position data indicating a pilot control position;
   a flight control configured to control a flight characteristic of the rotorcraft;
   a trim system connected to the pilot control and configured to move the pilot control; and
   a flight control computer (FCC) configured to receive the pilot control position data from the sensor, wherein the FCC is configured to execute a first flight control process, wherein the first flight control process comprises generating first flight control commands and sending the first flight control commands to the flight control to cause the rotorcraft to operate according to the first flight control process, wherein the flight control computer is further configured to generate, according to the first flight control commands, a trim signal indicating a target position for the pilot control and to send the trim signal to the trim system to cause the trim system to attempt to move the pilot control to the target position to reflect a position of the flight control, and wherein the flight control computer is further configured to monitor a working state of the trim system and execute a retrim process in response to determining that the trim system has failed.

2. The rotorcraft of claim 1, wherein the FCC is further configured to execute the retrim process by terminating the first flight control process and further by executing a second flight control process different from the first flight control process.

3. The rotorcraft of claim 2, wherein the FCC is further configured to execute the retrim process by providing a retrim prompt.

4. The rotorcraft of Claim 3, wherein the FCC is further configured to execute the retrim process by terminating the first flight control process in response to a pilot retrim command provided by a pilot after the retrim prompt is provided.

5. The rotorcraft of claim 1, wherein the FCC is further configured to implement an integrator that determines an error value associated with a difference between the pilot control position and the target position for the pilot control; and
wherein the FCC is further configured to determine the working state of the trim system according to the error value.

6. The rotorcraft of Claim 5, wherein the FCC is further configured to determine that the trim system has failed in response to the error value exceeding a retrim threshold for a predetermined time.

7. The rotorcraft of claim 6, wherein the FCC is further configured to determine that the trim system has failed further in response to determining that a pilot has released manual control of the pilot control and that the pilot control is in-detent.

8. A flight control computer (FCC), comprising:
a processor; and
a non-transitory computer-readable storage medium storing a program to be executed by the processor, the program including instructions for:
receiving pilot control position data from a pilot control sensor of a rotorcraft, the pilot control position data indicating a pilot control position of a pilot control associated with the pilot control sensor;
providing a first flight control process by generating first flight control commands according to the first flight control process and operating the rotorcraft according to the first flight control process by sending the first flight control commands to a flight control of the rotorcraft;
generating, according to the first flight control commands, a trim signal indicating a target position for the pilot control associated with a position of the flight control;
sending the trim signals to a trim system to cause the trim system to attempt to move the pilot control to the target position;
determining an operating state of the trim system according to the target position of the pilot control; and
providing a retrim process in response to the determining the operating state of the trim system indicating that the trim system has failed.

9. The FCC of claim 8, wherein the instructions for providing the retrim process include instructions for:
terminating the first flight control process; and
providing a second flight control process different from the first flight control process.

10. The FCC of Claim 9, wherein the instructions for providing the retrim process include instructions for providing a retrim prompt.

11. The FCC of claim 10, wherein the instructions for providing the retrim process include instructions for:
receiving a pilot retrim command provided by a pilot after the retrim prompt is provided; and
terminating the first flight control process in response to the pilot retrim command.

12. The FCC of claim 8, wherein the program further includes instructions for implementing an integrator that determines an error value associated with a difference between the pilot control position indicated by the pilot control position data and the target position for the pilot control; and
wherein the instructions for determining the operating state of the trim system include instructions to determine the operating state of the trim system according to the error value.

13. The FCC of claim 12, wherein the instructions for determining the operating state of the trim system include instructions for determining that the trim system has failed in response to the error value exceeding a retrim threshold for a predetermined time.

14. The FCC of claim 13, wherein the instructions for determining the operating state of the trim system include instructions for determining that the trim system has failed further in response to determining that a pilot has released manual control of the pilot control and that the pilot control is in-detent.

15. A method of operating a rotorcraft, comprising:
receiving, by a flight control computer (FCC), pilot control position data from a pilot control sensor of the rotorcraft, the pilot control position data indicating a pilot control position of a pilot control associated with the pilot control sensor;
providing, by the FCC, a first flight control process by generating first flight control commands according to the first flight control process and operating the rotorcraft according to the first flight control process by sending the first flight control commands to a flight control of the rotorcraft;
generating, by the FCC and according to the first flight control commands, a trim signal indicating a target position for the pilot control associated with a position of the flight control;
sending the trim signals by the FCC to a trim system to cause the trim system to attempt to move the pilot control to the target position;
determining an operating state of the trim system by the FCC and according to the target position of the pilot control; and providing, by the FCC, a retrim process in response to the determining the operating state of the trim system indicating that the trim system has failed.

16. The method of claim 15, wherein the providing the retrim process comprises:
   terminating the first flight control process; and
   providing a second flight control process different from the first flight control process.

17. The method of claim 16, wherein the providing the retrim process further comprises providing a retrim prompt.

18. The method of claim 17, wherein the providing the retrim process further comprises:
   receiving a pilot retrim command provided by a pilot after the providing the retrim prompt; and
   terminating the first flight control process in response to the pilot retrim command.

19. The method of claim 15, further comprising:
   determining an error value associated with a difference between pilot control position indicated by the pilot control position data and the target position for the pilot control; and
   wherein the determining the operating state of the trim system comprises determining the operating state of the trim system according to the error value.

20. The method of claim 19, wherein the determining the operating state of the trim system further comprises determining that the trim system has failed in response to the error value exceeding a retrim threshold for a predetermined time.

* * * * *